US011800353B2

(12) United States Patent
Lee et al.

(10) Patent No.: US 11,800,353 B2
(45) Date of Patent: Oct. 24, 2023

(54) LOCKING APPARATUS AND CONTROL METHOD THEREOF

(71) Applicant: SAMSUNG SDS CO., LTD., Seoul (KR)

(72) Inventors: Hyo Il Lee, Seoul (KR); Hee Jin Park, Seoul (KR); Dong Yeol Kim, Seoul (KR); Jong Soo Park, Seoul (KR); Seung Bae Lee, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 35 days.

(21) Appl. No.: 17/514,040

(22) Filed: Oct. 29, 2021

(65) Prior Publication Data
US 2022/0225089 A1    Jul. 14, 2022

(30) Foreign Application Priority Data

Jan. 14, 2021 (KR) .......................... 10-2021-0005154

(51) Int. Cl.
*H04W 12/63* (2021.01)
*H04W 12/0431* (2021.01)
*H04W 12/041* (2021.01)
*H04W 12/06* (2021.01)

(52) U.S. Cl.
CPC ..... *H04W 12/0431* (2021.01); *H04W 12/041* (2021.01); *H04W 12/06* (2013.01); *H04W 12/63* (2021.01)

(58) Field of Classification Search
CPC ........... H04W 12/0431; H04W 12/041; H04W 12/06; H04W 12/069; H04W 12/47; H04W 12/63; H04W 4/80; H04W 76/14; G07C 2009/00357; G07C 2009/00396; G07C 2209/64
See application file for complete search history.

(56) References Cited

U.S. PATENT DOCUMENTS

| 2014/0292481 A1* | 10/2014 | Dumas ............... G07C 9/00174 |
| | | 340/5.61 |
| 2015/0228137 A1* | 8/2015 | Chen ........................ G07C 9/23 |
| | | 340/5.7 |
| 2015/0294515 A1* | 10/2015 | Bergdale ................. H04W 4/80 |
| | | 340/5.61 |

(Continued)

FOREIGN PATENT DOCUMENTS

KR     10-2016-0122395 A     10/2016

*Primary Examiner* — Khoi V Le
(74) *Attorney, Agent, or Firm* — The PL Law Group, PLLC

(57) ABSTRACT

A locking apparatus according to an embodiment includes an approach detector, a signal transmitter, a measurer, and a controller. The approach detector detects an approach of a user carrying a terminal. The signal transmitter transmits a key authentication signal for authenticating a pre-shared digital key to the terminal using first short-range wireless communication when the approach of the user is detected. The measurer connects a session by generating a security channel with the terminal using second short-range wireless communication and measuring at least one of a distance to and an angle with respect to the terminal when the digital key is authenticated through the key authentication signal. The controller determines whether or not to unlock an access facility in accordance with at least one of the distance to and the angle with respect to the terminal.

18 Claims, 8 Drawing Sheets

(56) References Cited

U.S. PATENT DOCUMENTS

| | | | | |
|---|---|---|---|---|
| 2016/0337863 A1* | 11/2016 | Robinson | .............. | H04W 4/021 |
| 2020/0280853 A1* | 9/2020 | Osborn | ................ | H04W 24/10 |
| 2021/0126912 A1* | 4/2021 | Maclean | ............... | H04W 12/63 |
| 2021/0258796 A1* | 8/2021 | Li | .................... | G06Q 20/40145 |
| 2021/0385653 A1* | 12/2021 | Sau | ....................... | H04L 9/0844 |

* cited by examiner

LOCKING APPARATUS AND CONTROL METHOD THEREOF

CROSS-REFERENCE TO RELATED APPLICATION(S) AND CLAIM OF PRIORITY

This application claims priority from Korean Patent Application No. 10-2021-0005154, filed on Jan. 14, 2021, which is hereby incorporated by reference for all purposes as if fully set forth herein.

BACKGROUND

1. Field

Embodiments of the present disclosure relate to a locking apparatus for an access facility and a control method thereof.

2. Description of Related Art

Typically, a locking apparatus is widely used in entrances of a building, a door of a vehicle, a gate, etc. for security and safety. Recently, due to rapid development of electronic devices including smartphones, there have been a number of attempts to improve the convenience of users by controlling such a locking apparatus using a terminal.

In this regard, when the locking apparatus malfunctions, in convenience may be caused. Thus, in general, the locking apparatus communicates with the terminal using the Bluetooth low energy (BLE) protocol in order to guarantee a reliable operation in a low energy environment.

However, the locking apparatus using the BLE protocol is required to be connected to the terminal so as to be controlled. For the connection, the terminal must scan a signal advertised in a predetermined period from the locking apparatus. Thus, a significant time may be consumed for the connection, thereby causing inconvenience to the user.

In addition, the locking apparatus connected to the terminal in this manner may be automatically unlocked when the distance to the terminal is reduced to a predetermined distance or shorter. Then, the entrance may be opened in an unintended situation, thereby causing a security or safety problem.

The information disclosed in the Background section is only provided for a better understanding of the background and should not be taken as an acknowledgment or any form of suggestion that this information forms prior art that would already be known to a person having ordinary skill in the art.

SUMMARY

Embodiments of the present disclosure are intended to reduce a time necessary for controlling a locking apparatus.

In addition, Embodiments of the present disclosure are intended to provide a more reliable locking apparatus.

According to an aspect, a locking apparatus may include: an approach detector detecting an approach of a user carrying a terminal; a signal transmitter transmitting a key authentication signal for authenticating a pre-shared digital key to the terminal using first short-range wireless communication when the approach of the user is detected; a measurer connecting a session by generating a security channel with the terminal using second short-range wireless communication and measuring at least one of a distance to and an angle with respect to the terminal when the digital key is authenticated through the key authentication signal; and a controller determining whether or not to unlock an access facility in accordance with at least one of the distance to and the angle with respect to the terminal.

The approach detector may be at least one of an infrared (IR) sensor, an ultrasonic sensor, and a Doppler sensor for detecting the approach of the user carrying the terminal.

The signal transmitter may transmit the key authentication signal to the terminal in a predetermined period in accordance with a period in which the terminal scans the key authentication signal.

The first short-range wireless communication may be Bluetooth low energy (BLE) communication. The key authentication signal may include a BLE packet including identification information of the locking apparatus.

The digital key may be generated by the locking apparatus and provided in advance to the terminal, at an issuance request from the terminal, in a situation in which the terminal is paired with the locking apparatus using the first short-range wireless communication.

The measurer may track position information of the terminal using the second short-range wireless communication and measure at least one of the distance to and the angle with respect to the terminal using the position information of the terminal and position information of the locking apparatus.

The second short-range wireless communication may be ultra-wide band (UWB) wireless communication.

The controller may unlock the access facility when at least one of the distance to and the angle with respect to the terminal is equal to or smaller than a predetermined reference.

The controller may set the locking apparatus to a standby mode when at least one of the distance to and the angle with respect to the terminal is equal to or smaller than a predetermined reference, and may unlock the access facility when the user touches the locking apparatus in the standby mode.

The signal transmitter may transmit the key authentication signal to each of a plurality of user terminals when a plurality of users are detected as approaching. The measurer may generate a security channel common to user terminals, in each of which the digital key is reviewed, among the plurality of user terminals, and may connect the session having a separate slot to each of the terminals in which the digital key is reviewed.

According to another aspect, provided is a control method of a locking apparatus disposed on an access facility to lock and unlock the access facility. The method may include: detecting an approach of a user carrying a terminal; when the approach of the user is detected, transmitting a key authentication signal for authenticating a pre-shared digital key to the terminal using first short-range wireless communication; when the digital key is authenticated through the key authentication signal, connecting a session by generating a security channel with the terminal using second short-range wireless communication; measuring at least one of a distance to and an angle with respect to the terminal using the second short-range wireless communication; and determining whether or not to unlock the access facility in accordance with at least one of the distance to and the angle with respect to the terminal.

The approach detector may include at least one of an IR sensor, an ultrasonic sensor, and a Doppler sensor. In the detection of the approach of the user, the approach of the user may be detected using at least one of the IR sensor, the ultrasonic sensor, and the Doppler sensor.

In the transmission of the key authentication signal, the key authentication signal may be transmitted to the terminal in a predetermined period in accordance with a period in which the terminal scans the key authentication signal.

The first short-range wireless communication may be Bluetooth low energy (BLE) communication. The key authentication signal may include a BLE packet including identification information of the locking apparatus.

The digital key may be generated by the locking apparatus and provided in advance to the terminal, at an issuance request from the terminal, in a situation in which the terminal is paired with the locking apparatus using the first short-range wireless communication.

The measurement of at least one of the distance to and the angle with respect to the terminal may include tracking position information of the terminal using the second short-range wireless communication and measuring at least one of the distance to and the angle with respect to the terminal using the position information of the terminal and position information of the locking apparatus.

The second short-range wireless communication may be ultra-wide band (UWB) wireless communication.

The determination of whether or not to unlock the access facility may unlock the access facility when at least one of the distance to and the angle with respect to the terminal is equal to or smaller than a predetermined reference.

The determination of whether or not to unlock the access facility may include setting the locking apparatus to a standby mode when at least one of the distance to and the angle with respect to the terminal is equal to or smaller than a predetermined reference and unlocking the access facility when the user touches the locking apparatus in the standby mode.

The transmission of key authentication signal may transmit the key authentication signal to each of a plurality of user terminals when a plurality of users are detected as approaching. The connection of the session may include generating a security channel common to user terminals, in each of which the digital key is reviewed, among the plurality of user terminals, and connecting the session having a separate slot to each of the terminals in which the digital key is reviewed.

According to embodiments of the present disclosure, it is possible to lock or unlock the access facility without a connection through wireless communication between the locking apparatus and the terminal, thereby improving the operation speed of the locking apparatus and improving the convenience of users.

In addition, according to embodiments of the present disclosure, a wireless communication process and an unlocking process are performed after the locking apparatus has detected the approach of the user carrying the terminal. Consequently, it is possible to prevent the power of a battery from being unnecessarily consumed, thereby reducing the power consumption of the battery.

In addition, according to embodiments of the present disclosure, since the connection through wireless communication between the locking apparatus and the terminal is unnecessary, it is possible to transmit a key authentication signal to a plurality of users at once. Consequently, a distance and an angle between each of a plurality of terminals and the locking apparatus can be easily measured.

Furthermore, according to embodiments of the present disclosure, even in the case that a distance condition or an angle condition between the locking apparatus and the terminal is met, the locking apparatus can be unlocked only when the user touches the locking apparatus, thereby improving the security and reliability of the locking apparatus.

BRIEF DESCRIPTION OF DRAWINGS

The above and other objectives, features, and advantages of the present disclosure will be more clearly understood from the following detailed description, taken in conjunction with the accompanying drawings, in which.

DETAILED DESCRIPTION

Hereinafter, specific embodiments will be described with reference to the accompanying drawings. The following detailed description is provided to assist in a comprehensive understanding of at least one of a method, a device, and a system to be described herein. However, the detailed description is merely an example, and the present disclosure is not limited thereto.

In the description of embodiments of the present disclosure, a detailed description of known technologies related to the present disclosure will be omitted in the situation in which the subject matter of the present disclosure may be rendered rather unclear thereby. Terms to be used hereinafter will be defined in consideration of functions thereof in embodiments of the present disclosure, but may vary depending on the intentions of users or operators, as well as practices. Therefore, the terms shall be defined on the basis of the description throughout the specification. The terms used in the detailed description shall be interpreted as being illustrative, while not being limitative, of embodiments. Unless clearly used otherwise, a singular form includes a plural meaning. It shall be understood that expressions such as "comprise", "include", and "have" used herein are for indicating certain features, numbers, steps, operations, elements, a part or combinations thereof and are not excluding presence or possibility of one or more features, numbers, steps, operations, elements, a part or combinations thereof other than the above.

Figure 1:
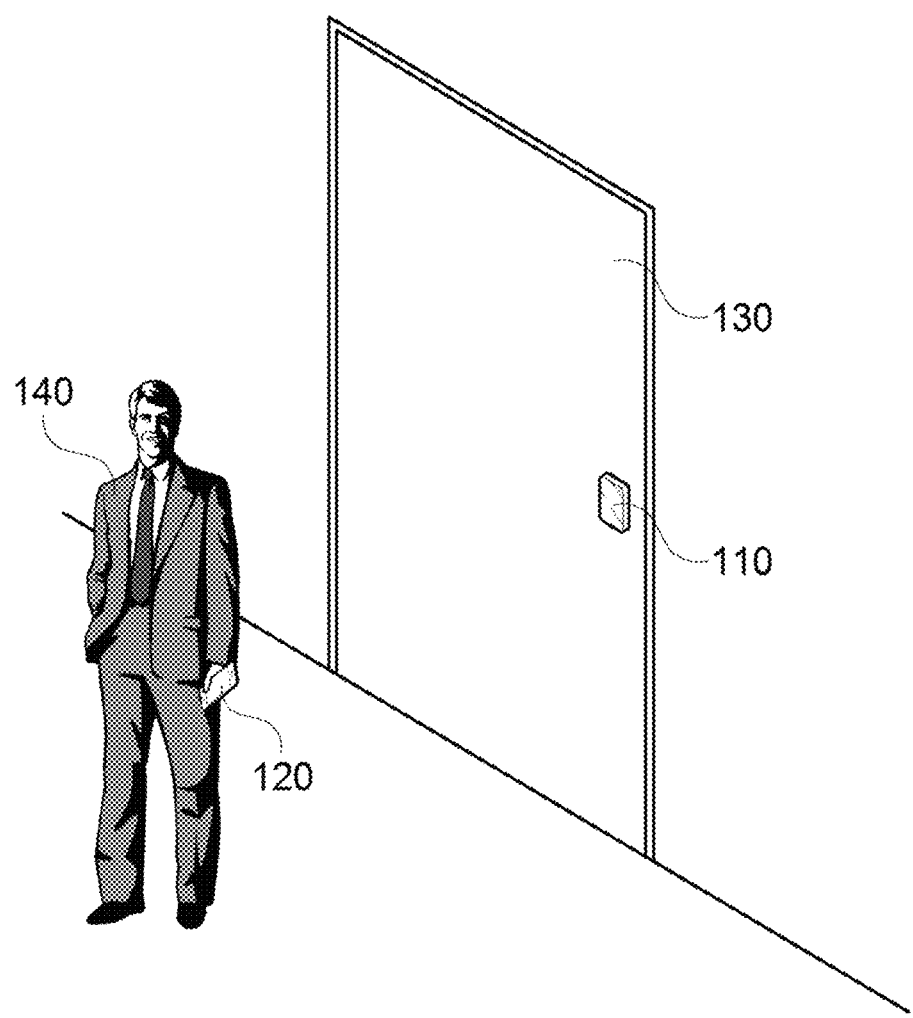
FIGS. 1 to 3 are example diagrams illustrating access facility opening-closing systems according to embodiments.
Figure 2:
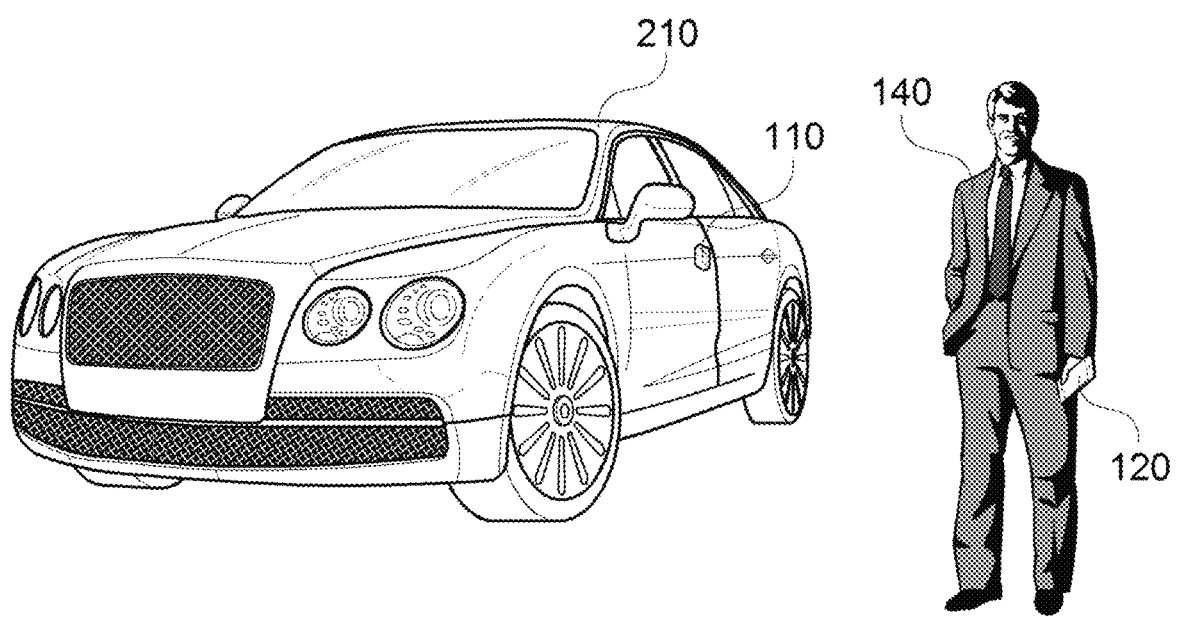
Figure 3:
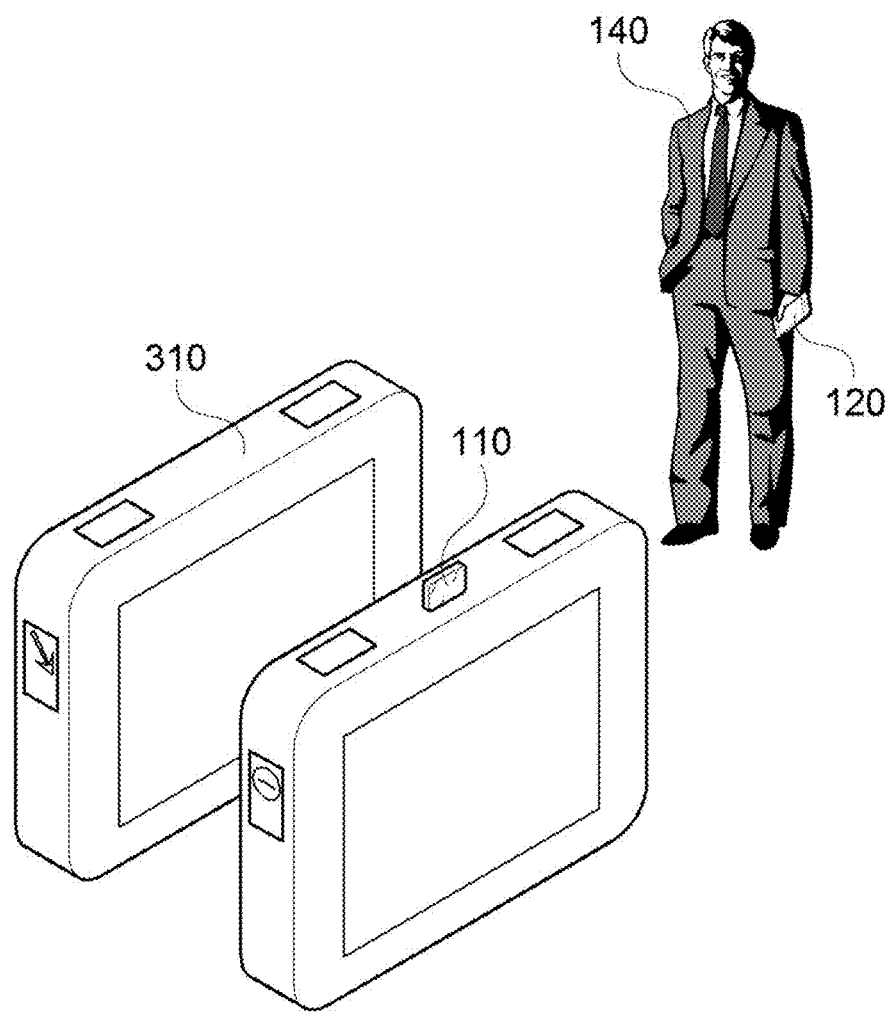

FIGS. 1 to 3 are example diagrams illustrating access facility opening-closing systems 100, 200, and 300 according to embodiments.

First, FIG. 1 illustrates an example access facility opening-closing system 100 for opening and closing a door 130 of a building.

Referring to FIG. 1, the access facility opening-closing system 100 according to an embodiment may include a locking apparatus 110 disposed on the door 130 of the building and a terminal 120 that a user 140 may carry.

In addition, when the user 140 carrying the terminal 120 approaches the door 130, the access facility opening-closing system 100 may open the door 130 from a locked position by wireless communication between the locking apparatus 110 and the terminal 120.

In addition, FIG. 2 illustrates an example access facility opening-closing system 200 for opening and closing a door of a vehicle 210.

Referring to FIG. 2, the access facility opening-closing system 200 according to an embodiment may include a locking apparatus 110 disposed on the door of the vehicle 210 and a terminal 120 that a user 140 may carry. In addition, when the user 140 carrying the terminal 120 approaches the vehicle 210, the access facility opening-closing system 200 may open the vehicle door from a locked position by wireless communication between the locking apparatus 110 and the terminal 120.

In addition, FIG. 3 illustrates an example gate opening-closing system 300 for opening and closing a gate 310.

Referring to FIG. 3, the gate opening-closing system 300 according to an embodiment may include a locking apparatus 110 disposed on an outer portion of the gate 310 and a terminal 120 that a user 140 may carry. In addition, when the user 140 carrying the terminal 120 approaches the gate 310, the gate opening-closing system 300 may open the gate 310, for example, by rotating a projecting bar from a locked position, by wireless communication between the locking apparatus 110 and the terminal 120.

In the embodiments illustrated in FIGS. 1 to 3, the locking apparatus 110 is an apparatus attached to an access facility to lock or unlock the access facility. According to an embodiment, the locking apparatus 110 may be connected to the terminal 120 by a means of wireless communication.

For example, the means of wireless communication may be a means of communication configured to perform communication using a short-range wireless communication method, such as Bluetooth, Bluetooth low energy (BLE), Wi-Fi, Zigbee, wireless local area network (WLAN), ultra-wide band (UWB), body coupled communication (BCC), or near field communication (NFC).

The terminal 120 is a portable device carried by the user 140 intended to enter or exit through the access facility. According to an embodiment, the terminal 120 may be a mobile communication device, such as a smartphone, a mobile station, a tablet computer, a personal digital assistant (PDA), a notebook computer, or a wearable device, such as a smartwatch or a fitness tracker.

According to an embodiment, the locking apparatus 110 may detect the approach of the user 140 carrying the terminal 120 to the access facility. When the approach of the user 140 is detected, the locking apparatus 110 may authenticate the terminal 120 by first wireless communication with the terminal 120 and measure the position of the terminal 120 by second wireless communication with the terminal 120. Afterwards, only when a physical quantity calculated on the basis of the measured position of the terminal 120 meets a predetermined condition, the locking apparatus 110 may unlock the access facility.

In addition, it should be understood that the locking apparatus 110 may be disposed on various types of access facilities required to restrict the access of unauthorized persons, in addition to the door 130 of the building illustrated in FIG. 1, the door of the vehicle 210 illustrated in FIG. 2, and the gate 310 illustrated in FIG. 3.

Figure 4:
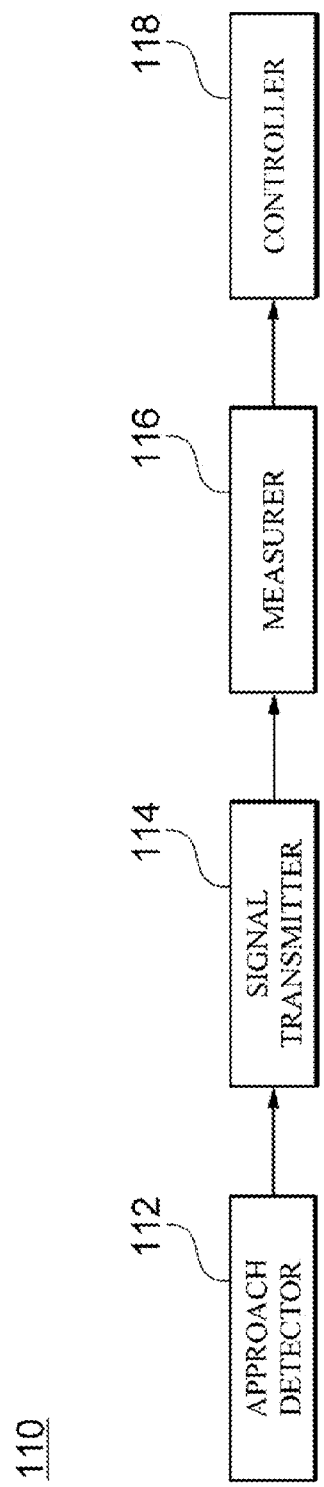
FIG. 4 is a block diagram illustrating a specific configuration of a locking apparatus according to an embodiment.

FIG. 4 is a block diagram illustrating the configuration of the locking apparatus 110 according to an embodiment.

As illustrated in FIG. 4, the locking apparatus 110 according to an embodiment includes an approach detector 112, a signal transmitter 114, a measurer 116, and a controller 118.

The approach detector 112 detects the approach of a user carrying the terminal 120.

According to an embodiment, the approach detector 112 may include at least one among an infrared (IR) sensor, an ultrasonic sensor, and a Doppler sensor for detecting the approach of the user carrying the terminal 120.

However, the means of the approach detector 112 for detecting the approach of the user is not limited to the IR sensor, the ultrasonic sensor, and the Doppler sensor. That is, the approach detector 112 may detect the approach of the user using various types of sensors able to detect an object approaching within a predetermined distance, in addition to the above-described sensors.

When the approach of the user carrying the terminal 120 is detected, the signal transmitter 114 transmits a key authentication signal for authentication of a pre-shared digital key to the terminal 120 using first short-range wireless communication. That is, since the signal transmitter 114 transmits the key authentication signal only when the approach of the user is detected, the key authentication signal may be prevented from being unnecessarily transmitted, thereby reducing the consumption of power of the locking apparatus 110.

According to an embodiment, the digital key to be authenticated by the signal transmitter 114 may be a digital key generated by the locking apparatus 110 and provided in advance to the terminal 120, at an issuance request from the terminal 120, in a situation in which the terminal 120 is paired with the locking apparatus 110 using the first short-range wireless communication.

That is, in this case, the digital key may be generated by the locking apparatus 110 to be shared between the locking apparatus 110 and the terminal 120 so as to serve as a reference by which the locking apparatus 110 determines whether to generate a security channel between the locking apparatus 110 and the terminal 120 and connect a session between the locking apparatus 110 and the terminal 120. This feature will be described in detail below with reference to FIG. 6.

In addition, according to an embodiment, the signal transmitter 114 may transmit the key authentication signal to the terminal 120 in a predetermined period, on the basis of a period in which the terminal 120 scans the key authentication signal.

Specifically, when the approach of the user carrying the terminal 120 is detected, the signal transmitter 114 may transmit the key authentication signal to the terminal 120 in a period shorter than a period in which the terminal 120 scans the key authentication signal.

That is, when the period in which the locking apparatus 110 transmits the key authentication signal is longer than the period in which the terminal 120 scans the key authentication signal, a significant time may be consumed for the terminal 120 to scan the key authentication signal of the locking apparatus 110. As a result, a time consumed for unlocking the access facility may be increased, thereby causing inconvenience to the user. To prevent this, the signal transmitter 114 may frequently transmit the key authentication signal in a period shorter than the scan period of the terminal 120, thereby reducing the time consumed for terminal 120 to scan the key authentication signal.

Figure 5:
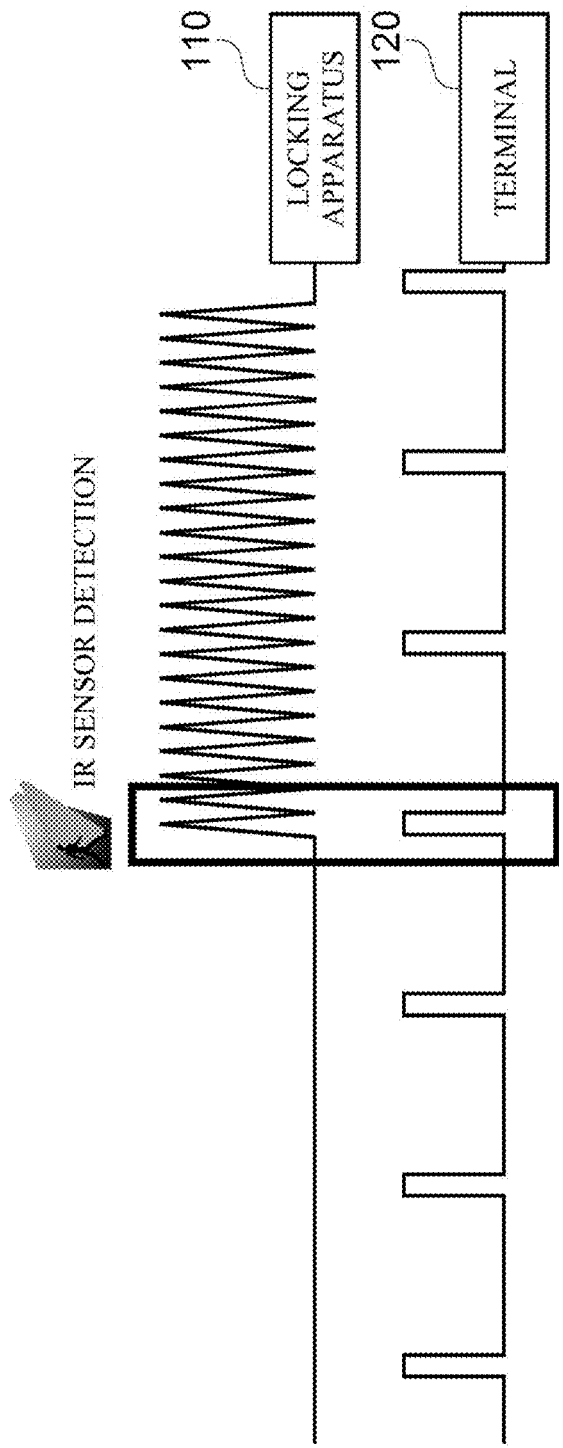
FIG. 5 is an example diagram illustrating a key authentication signal transmission process of the locking apparatus according to an embodiment.

FIG. 5 is an example diagram illustrating a key authentication signal transmission process of the locking apparatus 110 according to an embodiment.

Referring to FIG. 5, when the approach of a user carrying the terminal 120 is detected using an IR sensor, the locking apparatus 110 transmits the key authentication signal to the terminal 120 using Bluetooth low energy (BLE) communication from a point in time at which the approach is detected.

Here, a period in which the locking apparatus 110 transmits the key authentication signal to the terminal 120 may be set to be shorter than a period in which the key authentication signal is scanned. For example, it may be appreciated from FIG. 5 that the locking apparatus 110 continuously transmits the key authentication signal without a rest period, whereas a scan signal for scanning the key authentication signal of the terminal 120 occurs in a longer period.

When the key authentication signal transmitted by the locking apparatus 110 and the scan signal of the terminal 120 overlap in the same time section, the terminal 120 determines that scanning of the key authentication signal has succeeded. Thus, as described above, the shorter the period of the key authentication signal transmitted by the locking apparatus 110, the shorter the time consumed in scanning the key authentication signal may be.

Returning to FIG. 4, according to an embodiment, in a situation in which the digital key is provided in advance to the terminal 120 from the locking apparatus 110, the signal transmitter 114 may advertise a connection signal for establishing a communication channel between the locking apparatus 110 and the terminal 120.

In addition, according to an embodiment, the first short-range wireless communication may be BLE communication, and the key authentication signal may include a BLE packet including identification information of the locking apparatus 110.

Specifically, the BLE packet included in the key authentication signal may include following information:
(1) Identification information of the locking apparatus 110
(2) Bit information generated randomly in correspondence with the locking apparatus 110

Here, the BLE packet may include the identification information of the locking apparatus 110 and bit information generated randomly in correspondence with the locking apparatus 110 and concatenated with the identification information.

For example, each of the identification information of the locking apparatus 110 and the bit information generated randomly in correspondence with the locking apparatus 110 may be information comprised of 8 octet bits.

In addition, the BLE packet included in the key authentication signal may further include radio frequency unit (RFU) information. In this case, the BLE packet may further include the RFU information concatenated to the above-described information (1) and (2).

When the digital key is authenticated through the key authentication signal transmitted by the signal transmitter 114, the measurer 116 connects a session by generating a security channel using second short-range wireless communication and measures at least one of a distance to and an angle with respect to the terminal 120 using the second short-range wireless communication.

According to an embodiment, the measurer 116 may track position information of the terminal 120 using the second short-range wireless communication and measure at least one of the distance to and the angle with respect to the terminal 120 using the position information of the terminal 120 and position information of the locking apparatus 110.

In addition, according to an embodiment, the second short-range wireless communication may be ultra-wide band (UWB) wireless communication.

In addition, according to an embodiment, when a plurality of users carrying different terminals is detected as approaching, the signal transmitter 114 may transmit the key authentication signal to each of the terminals of the plurality of users. In this case, the measurer 116 may generate a security channel common to specific terminals, in each of which the digital key is reviewed, among the terminals of the plurality of users, and may connect a session having a separate slot to each of the terminals in which the digital key is reviewed.

That is, since the measurer 116 may generate the security channel common to the terminals each having the reviewed digital key and connect the session having a separate slot to each of the terminals in the corresponding security channel, when a plurality of users are trying to access the access facility at the same time, the user of the terminal that has actually controlled the locking apparatus 110 may be distinguished from the remaining users.

The controller 118 determines whether or not to unlock the access facility on the basis of at least one of the distance to and angle with respect to the terminal 120.

According to an embodiment, when at least one of the distance to and angle with respect to the terminal 120 is equal to or smaller than a predetermined reference, the controller 118 may unlock the access facility.

In an example, when the distance to the terminal 120 is equal to or smaller than a predetermined distance, the controller 118 may unlock the access facility. In another example, when the angle with respect to the terminal 120 is equal to or smaller than a predetermined angle, the controller 118 may unlock the access facility. In addition, in some embodiments, only when the distance to the terminal 120 is equal to or smaller than a predetermined distance and the angle with respect to the terminal 120 is equal to or smaller than a predetermined angle, the controller 118 may unlock the access facility.

According to a different embodiment, when at least one of the distance to and angle with respect to the terminal 120 is equal to or smaller than a predetermined reference, the controller 118 may set the locking apparatus 110 to a standby state. Afterwards, when a user operating the locking apparatus 110 is detected within a predetermined time, the controller 118 may unlock the access facility. Consequently, even in the case that the locking apparatus 110 is set to a standby state against the user intention, when a user operation is not detected, the controller 118 may not unlock the access facility, thereby improving the security of the locking apparatus 110 and improving the convenience of the user.

In addition, the user operation of the locking apparatus 110 may be performed by, for example, the user touching the locking apparatus 110 or operating buttons provided on the locking apparatus 110. In this regard, the locking apparatus 110 may be provided with a touch sensor, buttons, etc. for detecting the user operation.

In addition, in the embodiment illustrated in FIG. 4, each component may have a function and capability different from those to be described below, and an additional component not described below may be included.

In addition, according to an embodiment, each of the approach detector 112, the signal transmitter 114, the measurer 116, and the controller 118 may be realized using one or more devices physically separate from each other or by one or more processors and a combination of one or more processors and software. Differently from the illustration, specific operations thereof may not be clearly differentiated. For example, the functions of the approach detector 112, the signal transmitter 114, and the controller 118 may be performed by locking apparatus firmware realized by combining one or more processors and software, while the function of the measurer 116 may be performed by a security UWB service applet.

Figure 6:
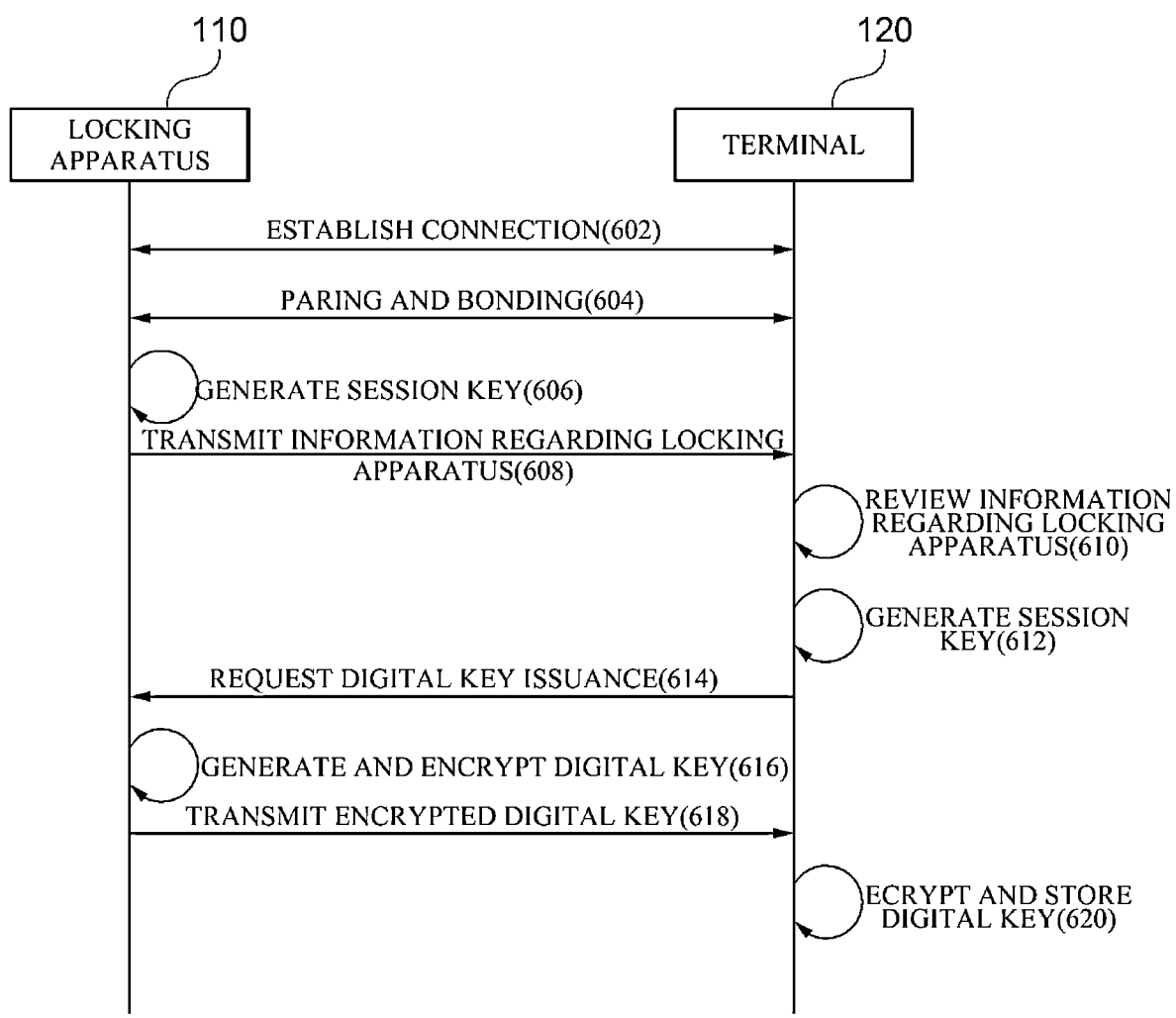
FIG. 6 is a flow diagram illustrating a digital key providing method according to an embodiment.

FIG. 6 is a flow diagram illustrating a digital key providing method according to an embodiment.

The method illustrated in FIG. 6 may be performed by the above-described locking apparatus 110.

First, when a user carrying the terminal 120 is detected as approaching, the locking apparatus 110 advertises a signal having a predetermined period to the terminal 120 and establishes a connection to the terminal 120 that has scanned the advertised signal in 602.

According to an embodiment, the term "establishing a connection" may mean that a BLE communication channel is established between the locking apparatus 110 and the terminal 120.

Afterwards, the locking apparatus 110 performs paring by exchanging security information, such as a short-term key (STK), a long-term key (LTK), an identity resolving key (IRK), and a connection signature resolving key (CSRK), with the terminal 120 to which the connection is established and performs bonding by storing a pairing process in each of the locking apparatus 110 and the terminal 120 in 604.

Subsequently, the locking apparatus 110 generates bit information corresponding to the locking apparatus 110 and generates a session key using the generated bit information and a pre-shared key in order to share the session for issuance and provision of the digital key with the terminal 120 in 606.

In the following embodiments, the "pre-shared key" used in generation of the session key means a unique key issued in the fabrication of the locking apparatus 110.

Afterwards, the locking apparatus 110 transmits information related to the locking apparatus to the terminal 120 in 608.

According to an embodiment, the information related to locking apparatus may include a BLE packet. The BLE packet may include identification information of the locking apparatus 110 and bit information generated randomly in correspondence with the locking apparatus 110.

Afterwards, the terminal 120 reviews the identification information of the locking apparatus 110 in 610, and generates a session key using the bit information generated randomly in correspondence with the locking apparatus 110 and a pre-shared key in 612.

Afterwards, the session is shared between the locking apparatus 110 and the terminal 120 due to the generation of the session key, the terminal 120 requests the locking apparatus 110 issue a digital key in 614.

Subsequently, the locking apparatus 110 generates the digital key in response to the request from the terminal 120 and encrypts the digital key using the generated session key in 616.

Afterwards, the locking apparatus 110 transmits the encrypted digital key to the terminal 120 in 618.

Subsequently, the terminal 120 decrypts the encrypted digital key using the generated session key and stores the decrypted digital key in 620.

According to an embodiment, the steps 602, 604, 608, 610, 614, and 618 among the steps 602 to 620 described with reference to FIG. 6 may be performed using at least one of locking apparatus firmware provided in the locking apparatus 110 and a digital key application provided in the terminal 120.

In addition, according to an embodiment, the steps 606 and 616 may be performed by a locking apparatus applet provided in the locking apparatus 110, and the steps 612 and 620 may be performed in a digital key applet provided in the terminal 120. However, it should be understood that the subjects performing the steps are not limited thereto and may vary depending on the design of the locking apparatus 110 and the terminal 120.

Figure 7:
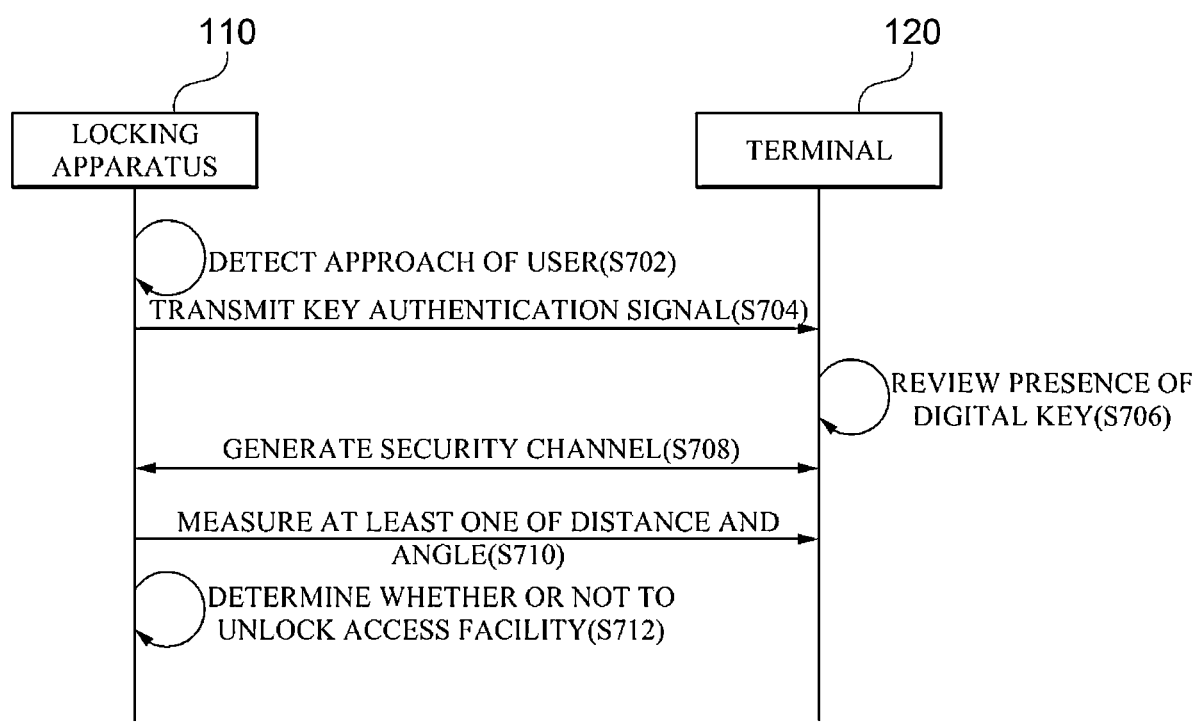
FIG. 7 is a flow diagram illustrating a control method of a locking apparatus according to an embodiment.

FIG. 7 is a flow diagram illustrating a control method of a locking apparatus according to an embodiment.

The method illustrated in FIG. 7 may be performed by, for example, the above-described locking apparatus 110.

First, the locking apparatus 110 detects a user carrying the terminal 120 as approaching in 702.

Afterwards, when the approach of the user carrying the terminal 120 is detected, the locking apparatus 110 transmits a key authentication signal for authenticating a pre-shared digital key to the terminal 120 using first short-range wireless communication in 704.

Subsequently, in 706, the terminal 120 determines whether or not a digital key shared between the terminal 120 and the locking apparatus 110 is present in a digital key table stored in the terminal 120, in response to the key authentication signal of the locking apparatus 110.

That is, "the digital key being authenticated" may mean the digital key shared between the terminal 120 and the locking apparatus 110 is present in the digital key table stored in the terminal 120.

Afterwards, when the digital key is determined to be present, the locking apparatus 110 connects a session by generating a security channel between the locking apparatus 110 and the terminal 120 using the second short-range wireless communication in 708.

Specifically, when the digital key is determined to be present, the locking apparatus 110 may generate a session key using bit information generated randomly in correspondence with the locking apparatus 110 and a pre-shared key. In addition, the terminal 120 may review identification information of the locking apparatus 110 included in a BLE packet in the key authentication signal of the locking apparatus 110, and then, generate a session key using bit information generated in correspondence with the locking apparatus 110 and a pre-shared key.

In this case, session information according to the session key generated by the locking apparatus 110 and session information according to the session key generated by the terminal 120 match each other. Thus, the locking apparatus 110 may generate the security channel with the terminal 120 and connect the session using the session information.

Afterwards, the locking apparatus 110 measures at least one of a distance to and an angle with respect to the terminal 120 using second short-range wireless communication in 710.

Subsequently, the locking apparatus 110 determines whether or not to unlock access facility on the basis of at least one of the distance to and angle with respect to the terminal 120 in 712.

According to an embodiment, the steps 702, 704, 706, and 712 among the steps 702 to 712 described above with reference to FIG. 7 may be performed using at least one of locking apparatus firmware provided in the locking apparatus 110 and a digital key application provided in the terminal 120.

In addition, according to an embodiment, the steps 708 and 710 may be performed by a security UWB service applet provided in each of the locking apparatus 110 and the terminal 120. However, it should be understood that the subjects performing the steps are not limited thereto and may vary depending on the design of the locking apparatus 110 and the terminal 120.

Although the method has been described as being divided into a plurality of steps in FIGS. 6 and 7, at least some steps thereof may be performed in different sequences, performed in combination with other steps, omitted, or divided into sub-steps, or one or more steps not shown may be added thereto.

Figure 8:
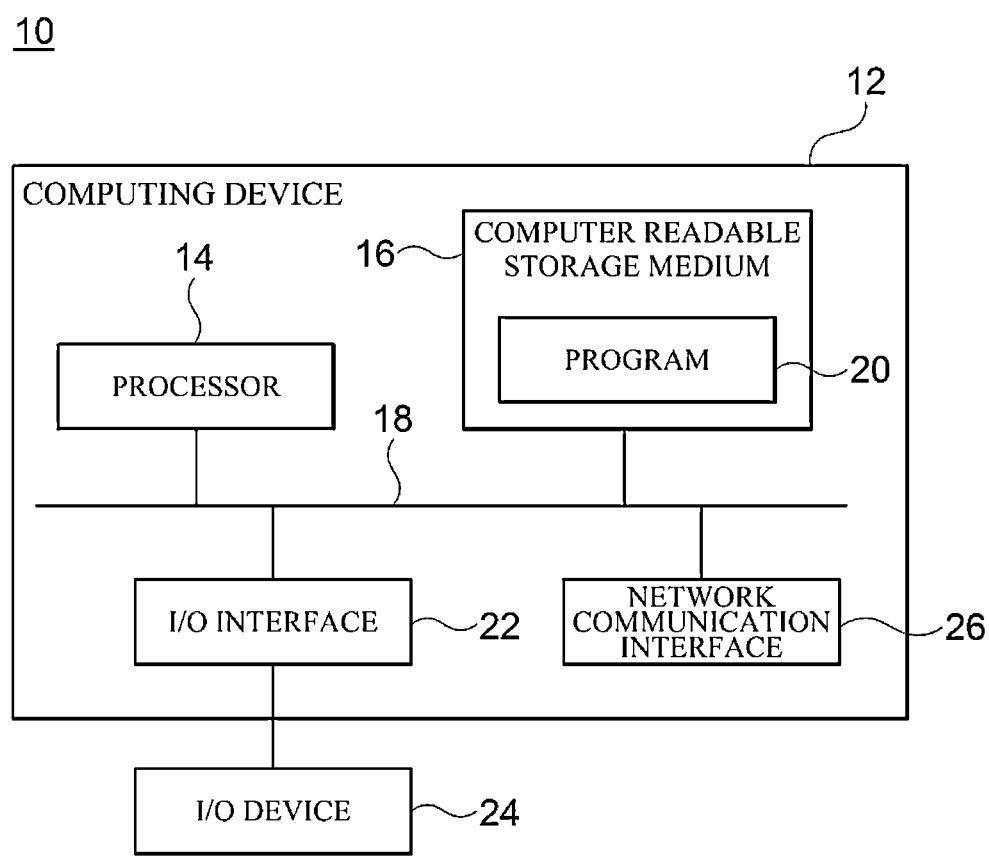
FIG. 8 is a block diagram illustrating a computing environment including a computing apparatus according to an embodiment.

FIG. 8 is a block diagram illustrating a computing environment 10 including a computing apparatus according to an embodiment. In the illustrated embodiment, each component may have a function and capability different from those to be described below, and an additional component not described below may be included.

The illustrated computing environment 10 includes a computing device 12. According to an embodiment, the computing device 12 may be the locking apparatus 110. In addition, the computing device 12 may be the terminal 120 according to an embodiment.

The computing device 12 includes at least one processor 14, a computer readable storage medium 16, and a communication bus 18. The processor 14 may allow the computing device 12 to operate according to the example embodiments described above. For example, the processor 14 may execute one or more programs stored in the computer readable storage medium 16. The one or more programs may in lude one or more computer executable instructions executable. The computer executable instructions executable may be configured to allow the computing device 12 to perform the operations according to the example embodiments when executed by the processor 14.

The computer readable storage medium 16 may be configured to store, computer executable instructions, program codes, program data, and/or other suitable forms of information. A program 20 stored in the computer readable storage medium 16 may include a set of instructions executable by the processor 14. According to an embodiment, the computer readable storage medium 16 may be a memory (e.g., a volatile memory such as a random access memory, a non-volatile memory, or a combination thereof), one or more magnetic disk storage devices, optical disk storage devices, flash memory devices, different types of storage media which can be accessed by the computing device 12 and store intended information, or a combination thereof.

The communication bus 18 may include the processor 14 and the computer readable storage medium 16, and interconnect various components of the computing device 12 to each other.

The computing device 12 may include one or more input/output (I/O) interfaces 22 providing an interface for one or more I/O devices 24 and one or more network communication interfaces 26. The I/O interface 22 and the network communication interfaces 26 may be connected to the communication bus 18. The I/O devices 24 may be connected to other components of the computing device 12 through the I/O interfaces 22. The I/O devices 24 may include input devices, such as a pointing device (e.g., a mouse and a track pad), a keyboard, a touch input device (e.g., a touch pad and a touch screen), a voice or sound input device, various types of sensors, and/or a capturing device, and/or output devices, such as a display device, a printer, a speaker, and/or a network card. Each of the I/O devices 24 may one component constituting the computing device 12, may be included in the computing device 12, or may be connected to the computing device 12 as a device separate from the computing device 12.

The specific embodiments described herein may be implemented using hardware components, software components, and/or a combination thereof. For example, the apparatus, method, and components described in the foregoing embodiments may be realized using one or more general purpose computers or special purpose computers, such as a processor, a controller, an arithmetic logic unit (ALU), a digital signal processor, a microcomputer, a field programmable gate array (FPGA), a programmable logic unit (PLU), a microprocessor, and any other devices capable of executing and responding to instructions. The processing device may execute an operating system (OS) and one or more software applications that run on the OS. The processing device also may access, store, manipulate, process, and create data in response to execution of the software. For the sake of simplicity, the processing device used has been described as being singular; however, a person having ordinary skill in the art will appreciate that the processing device may include a plurality of processing elements and a plurality of types of processing elements. For example, the processing device may include a plurality of processors or a processor and a controller. In addition, different processing configurations, such as a parallel processor, are possible.

The software may include a computer program, codes, instructions, or at least one combination thereof. The software may configure the processing device or independently or collectively instruct the processing device to operate as intended. At least one of software and data may be embodied permanently or temporarily in any type of machine, component, physical or virtual equipment, computer storage medium or device, or a propagated signal wave in order to be interpreted by or provide instructions or data to the processing device. The software may also be distributed over network-coupled computer systems so as to be stored or executed in a distributed fashion. The software and data may be stored in one or more computer readable recording media.

Although the exemplary embodiments of the present disclosure have been described in detail hereinabove, a person having ordinary knowledge in the technical field to which the present disclosure pertains will appreciate that various modifications are possible to the foregoing embodiments without departing from the scope of the present disclosure. Therefore, the scope of protection of the present disclosure shall not be limited to the foregoing embodiments but shall be defined by the appended Claims and equivalents thereof.

What is claimed is:

1. A locking apparatus comprising:
an approach detector detecting an approach of a user carrying a terminal, wherein the approach detector comprises at least one of an infrared sensor, an ultrasonic sensor, or a Doppler sensor for detecting the approach of the user carrying the terminal;
a signal transmitter transmitting a key authentication signal for authenticating a pre-shared digital key to the terminal using first short-range wireless communication when the approach of the user is detected, the key authentication signal including identification information of the locking apparatus to be used to authenticate the pre-shared digital key for unlocking the locking apparatus using the terminal;
a measurer connecting a session by generating a security channel with the terminal using second short-range wireless communication different from the first short-range wireless communication and measuring at least one of a distance to or an angle with respect to the terminal when the digital key is authenticated through the key authentication signal; and
a controller determining whether or not to unlock an access facility in accordance with at least one of the distance to or the angle with respect to the terminal.

2. The locking apparatus according to claim 1, wherein the signal transmitter transmits the key authentication signal to the terminal in a predetermined period in accordance with a period in which the terminal scans the key authentication signal.

3. The locking apparatus according to claim 1, wherein the first short-range wireless communication is Bluetooth low energy (BLE) communication; and the key authentication signal comprises a BLE packet including identification information of the locking apparatus.

4. The locking apparatus according to claim 1, wherein the digital key is generated by the locking apparatus and provided in advance to the terminal, at an issuance request from the terminal, in a situation in which the terminal is paired with the locking apparatus using the first short-range wireless communication.

5. The locking apparatus according to claim 1, wherein the measurer tracks position information of the terminal using the second short-range wireless communication and measures at least one of the distance to or the angle with respect to the terminal using the position information of the terminal and position information of the locking apparatus.

6. The locking apparatus according to claim 1, wherein the second short-range wireless communication is ultra-wide band (UWB) wireless communication.

7. The locking apparatus according to claim 1, wherein the controller unlocks the access facility when at least one of the distance to or the angle with respect to the terminal is equal to or smaller than a predetermined reference.

8. The locking apparatus according to claim 1, wherein the controller sets the locking apparatus to a standby mode when at least one of the distance to or the angle with respect to the terminal is equal to or smaller than a predetermined reference, and unlocks the access facility when the user touches the locking apparatus in the standby mode.

9. The locking apparatus according to claim 1, wherein the signal transmitter transmits the key authentication signal to each of a plurality of user terminals when a plurality of users are detected as approaching; and the measurer generates a security channel common to user terminals, in each of which the digital key is reviewed, among the plurality of user terminals, and connects the session having a separate slot to each of the terminals in which the digital key is reviewed.

10. A control method of a locking apparatus disposed on an access facility to lock and unlock the access facility, the method comprising:

detecting an approach of a user carrying a terminal using an approach detector, wherein the approach detector comprises at least one of an infrared sensor, an ultrasonic sensor, or a Doppler sensor;

when the approach of the user is detected, transmitting a key authentication signal for authenticating a pre-shared digital key to the terminal using first short-range wireless communication the key authentication signal including identification information of the locking apparatus to be used to authenticate the pre-shared digital key for unlocking the locking apparatus using the terminal;

when the digital key is authenticated through the key authentication signal, connecting a session by generating a security channel with the terminal using second short-range wireless communication different from the first short-range wireless communication;

measuring at least one of a distance to or an angle with respect to the terminal using the second short-range wireless communication; and determining whether or not to unlock the access facility m accordance with at least one of the distance to or the angle with respect to the terminal.

11. The control method according to claim 10, wherein, in the transmission of the key authentication signal, the key authentication signal is transmitted to the terminal in a predetermined period in accordance with a period in which the terminal scans the key authentication signal.

12. The control method according to claim 10, wherein the first short-range wireless communication is Bluetooth low energy (BLE) communication; and the key authentication signal comprises a BLE packet including identification information of the locking apparatus.

13. The control method according to claim 10, wherein the digital key is generated by the locking apparatus and provided in advance to the terminal, at an issuance request from the terminal, in a situation in which the terminal is paired with the locking apparatus using the first short-range wireless communication.

14. The control method according to claim 10, wherein the measurement of at least one of the distance to or the angle with respect to the terminal comprises tracking position information of the terminal using the second short-range wireless communication and measuring at least one of the distance to or the angle with respect to the terminal using the position information of the terminal and position information of the locking apparatus.

15. The control method according to claim 10, wherein the second short-range wireless communication is ultra-wide band (UWB) wireless communication.

16. The control method according to claim 10, wherein the determination of whether or not to unlock the access facility unlocks the access facility when at least one of the distance to or the angle with respect to the terminal is equal to or smaller than a predetermined reference.

17. The control method according to claim 10, wherein the determination of whether or not to unlock the access facility comprises setting the locking apparatus to a standby mode when at least one of the distance to or the angle with respect to the terminal is equal to or smaller than a predetermined reference and unlocking the access facility when the user touches the locking apparatus in the standby mode.

18. The control method according to claim 10, wherein the transmission of key authentication signal transmits the key authentication signal to each of a plurality of user terminals when a plurality of users are detected as approaching; and the connection of the session comprises generating a Securely channel common to user terminals, in each of which the digital key is reviewed, among the plurality of user terminals, and connecting the session having a separate slot to each of the terminals in which the digital key is reviewed.

* * * * *